United States Patent
Wang Chen

(10) Patent No.: US 8,551,672 B2
(45) Date of Patent: Oct. 8, 2013

(54) PACKAGING STRUCTURE OF LOW-PRESSURE MOLDED FUEL CELL

(75) Inventor: Kuei Yung Wang Chen, Taipei (TW)

(73) Assignee: High Tech Battery Inc., Taipei (TW)

( * ) Notice: Subject to any disclaimer, the term of this patent is extended or adjusted under 35 U.S.C. 154(b) by 847 days.

(21) Appl. No.: 12/652,047

(22) Filed: Jan. 5, 2010

(65) Prior Publication Data

US 2010/0173206 A1  Jul. 8, 2010

(30) Foreign Application Priority Data

Jan. 5, 2009  (TW) ............................... 98100032 A

(51) Int. Cl.
*H01M 2/08*  (2006.01)
(52) U.S. Cl.
USPC ......................................... 429/510; 429/460
(58) Field of Classification Search
USPC .................................. 429/402–407, 507–511
See application file for complete search history.

(56) References Cited

U.S. PATENT DOCUMENTS

| 4,041,211 | A | 8/1977 | Wiacek |
| 4,214,044 | A * | 7/1980 | Chevet et al. ................. 429/405 |
| 6,069,107 | A * | 5/2000 | Kuznetsov et al. ........... 502/101 |
| 6,461,765 | B1 | 10/2002 | Witzigreuter |
| 6,562,504 | B2 * | 5/2003 | Faris et al. .................... 429/404 |
| 2002/0041988 | A1 * | 4/2002 | Payne et al. .................... 429/27 |
| 2007/0212587 | A1 * | 9/2007 | Fragiadakis et al. ............ 429/35 |
| 2008/0305375 | A1 * | 12/2008 | Yang et al. ..................... 429/27 |

OTHER PUBLICATIONS

Henkel product properties of Macromelt printed Jan. 27, 2012.*

* cited by examiner

*Primary Examiner* — Maria J Laios
(74) *Attorney, Agent, or Firm* — WPAT, P.C.; Anthony King

(57) ABSTRACT

A packaging structure of a low-pressure molded fuel cell comprises a hot melt adhesive layer, which is formed through a low-pressure molding process using a hot melt adhesive that has specific material properties and will become molten when being heated. The molten hot melt adhesive is injected into the cell via injection holes formed on a housing or a mounting element to flow through a C-sectioned flow channel, so as to tightly enclose and bond to edges of the air cathode and separator for the cell. After the hot melt adhesive is solidified, a chemical-resistant hot melt adhesive layer with good sealing and enclosing ability as well as high adhesion strength and elasticity, being bubble removed at controlled pressure and the hot melt adhesive material is formed to firmly bond to the cell components and tightly seal the cell, so as to effectively prevent electrolyte in the cell from leaking.

20 Claims, 10 Drawing Sheets

A-A

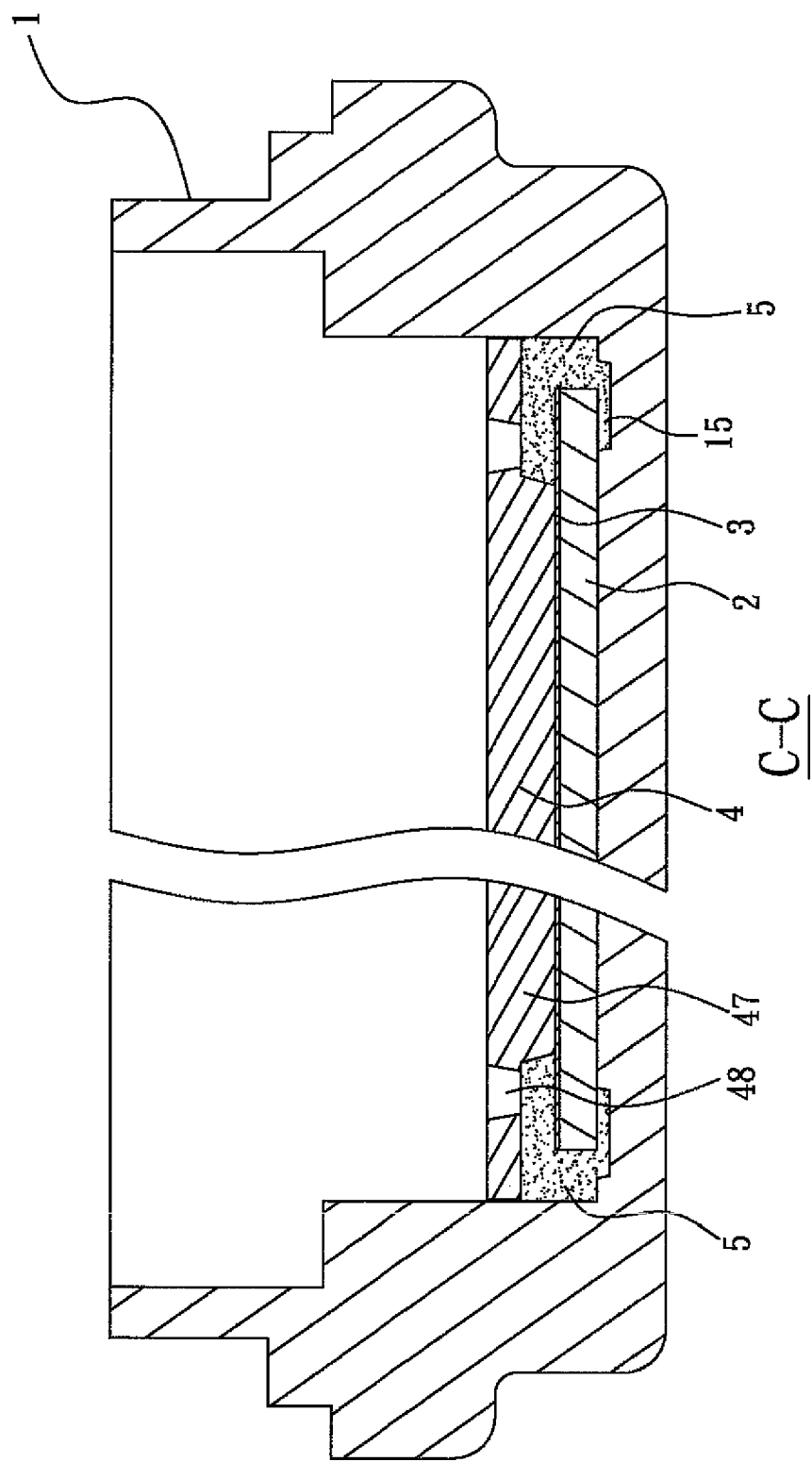

PACKAGING STRUCTURE OF LOW-PRESSURE MOLDED FUEL CELL

FIELD OF THE INVENTION

The present invention relates to a fuel cell, and more particularly to a packaging structure of a fuel cell formed by low-pressure molding technique for preventing electrolyte leakage.

BACKGROUND OF THE INVENTION

A currently commercially available fuel cell, such as a zinc-air cell, includes a housing, a cathode, a separator and an anode. The zinc-air cell generates electricity through an electrochemical reaction which provides a usable electric current flow through an external circuit connected between the anode and the cathode. In order to perform the overall reaction of the zinc-air cell, the cell also needs the electrolyte solution, such as potassium hydroxide, in which the hydroxide ions ($OH^-$) as the charge carries transfers medium between the anode and the cathode. The zinc-air cell uses zinc as an anode, which can be made from a zinc gel, zinc sheet or zinc plate, and the air cathode made of carbon, a polytetrafluoroethylene (PTFE) binder and a catalyst. The separator of the zinc-air cell can be a porous film formed from polymers, a solid polymer electrolyte or a PP/PE non-woven fabric sheet, and it is placed between the cathode and the anode to avoid short circuit of the cell. However, when the zinc contacts with the alkaline electrolyte, there would be a side reaction in which a part of the zinc is corroded so as to cause reduction of the capacity, and hydrogen gas is also produced so as to increase the internal pressure of the cell, further resulting in the electrolyte leakage, that is, the electrolyte in the cell diffuses out to the housing or even to an external circuit interface. The electrolyte leakage problem will adversely shorten the shelf life of the cell and cause an environmental pollution issue.

It is therefore an important issue among fuel cell manufacturers to effectively prevent electrolyte leakage. U.S. Pat. No. 4,041,211 discloses the packaging of a cell comprising a downwardly tapered polymeric seal and an alkali resistant elastomer characterized by an ability to creep under pressure substantially without cracking or forming voids. U.S. Pat. No. 6,461,765 discloses the packaging of a cell by using an L-shaped peripheral grid and an asphalt sealant or a Versamid adhesive, as well as the ultrasonic welding. However, none of these cell packages can establish completely sealing for the cell. Besides, some manufacturers also disclose the packaging of a cell through riveting and compressing with a gasket, further using more than one sealant, such as an alkali-resistant adhesive, epoxy, asphalt, modified pitch, and hot melt adhesive.

In the above-mentioned fuel cell packaging manners, either riveting or compressing the gasket or using more than one sealant to seal the cell, none of them can achieve an exact sealing and leak-proof effect. The mainly reasons are as follows:

(1) In the above riveted structure, an intermediate gasket is compressed using a riveting pressure to seal the cell. While the compressed gasket provides good sealing effect at the beginning, it gradually loses the sealing effect after it has been used over a long time due to aging thereof. While the sealant has been used to reinforce the sealing effect of the compressed gasket, it fails to completely solve the leakage problem of the electrolyte; it is caused by increasing internal pressure of the cell.

(2) The air cathode is a porous structure having a plurality of micropores, and thus there produces a lot of air bubbles to run into the sealant while the air cathode is contacted and covered with the sealant, and particularly is completely covered by the sealant. No matter to use any sealant in the process of molding the cell for the purpose of sealing the cell, the air bubbles in the pores would diffuse into the sealant (i.e. the air bubbles to run into the sealant from the pores) as time goes by. Therefore, it is difficult to effectively remove the air bubbles using a common packaging method. The air bubbles would decrease the packaging strength of the sealant or form leakage channels between the cell and the external environment so as to cause leakage of the electrolyte.

(3) The air cathode is made of carbon, a polytetrafluoroethylene (PTFE) binder and a catalyst, and has relatively low mechanical strength. Therefore, the air cathode is easily deformed when being bent by an external force, and the interface between the air cathode and the sealant is easily deformed due to the thermal expansion and contraction. Moreover, since the material properties of the air cathode and the sealing are different, an interface between the air cathode and the sealant tends to crack, which results in the leakage of the electrolyte from the cell. In fact, the air cathode in contact with the separator consists of a hydrophilic carbon material, which will absorb the electrolyte and form a diffusion channel for the electrolyte. Therefore, the prior art cell packaging manner by compression could not effectively prevent the electrolyte from leakage at all.

(4) The air cathode is a porous structure having the micropores that allow air to freely move in and out to perform the cell reaction. However, during the reaction, zinc oxide products would be gradually deposited on the separator and form a dense structure so as to block the separator. Thus, zinc oxide having the dense structure would become a barrier that blocks the gas, thereby resulting in excessively increasing internal pressure of the cell. The higher the internal pressure of the cell, the larger the deformation of the cell, thereby causing the leakage of the electrolyte.

(5) The existing packaging structure of the zinc-air cell is manufactured by a composite method, such as riveting and adhesive sealing, or adhesive sealing and ultrasonic welding. Such composite packaging structure involves complicated assembly or requires precision equipment so as to increase the structural complexity and cost of the manufacturing device. In addition, the more the types of sealants are used, the easier the electrolyte leakage occurs. Moreover, the sealants are different in their physical and chemical properties, and hence the electrolyte leakage of the zinc-air cell would occur due to the variation of the temperature, vibration, and the other environmental factors.

It has been suggested in US Patent Publication No. 2008/0160413 A1 to use a hot melt adhesive to package the alkaline cell. However, the suggested packaging manner lies in adhering or caulking the cell components with the hot melt adhesive without really achieving the target of effective sealing and electrolyte leakage prevention. It is therefore desirable to develop an improved packaging structure of a fuel cell to overcome the problems in the prior art cell packages.

SUMMARY OF THE INVENTION

A primary object of the present invention is to provide a packaging structure of a low-pressure molded fuel cell to effectively remove air bubbles in the sealant used to seal the fuel cell, so that the sealant can perfectly cover the cell components and seal the cell to achieve the purpose of leak prevention with a simplified process.

To achieve the above and other objects, the packaging structure of the low-pressure molded fuel cell according to a first embodiment of the present invention comprises:

a housing having a plurality of air vents disposed through at least one wall thereof, a recessed first receiving space formed on and around an inner side of the wall having the air vents, and at least one injection hole and at least one first gas exhaust hole disposed through a peripheral wall of the housing to communicate with the first receiving space;

an air cathode being a porous structure having a plurality of micropores and disposed on the inner side of the wall of the housing having the air vents;

a separator disposed on an inner surface of the air cathode;

a mounting element disposed in the housing and being a hollow structure for receiving an anode therein; the mounting element being provided with a raised annular flange on one side adjacent to the separator, such that a recessed second receiving space is formed around an outer periphery of the raised annular flange; and the second receiving space together with the first receiving space forming a C-sectioned flow channel; and a hot melt adhesive layer, which is formed through a low-pressure molding process using a hot melt adhesive that has specific material properties and will become molten when being heated; the molten hot melt adhesive being injected into the cell via injection holes formed on the housing to flow through the C-sectioned flow channel, so as to tightly enclose and bond to edges of the air cathode and the separator in the cell, and air in the flow channel being discharged via the first gas exhaust holes. Wherein, after the hot melt adhesive is solidified, a chemical-resistant hot melt adhesive layer being formed on a C-sectioned annular structure and with good sealing and enclosing ability as well as high adhesion strength and elasticity, being bubble removed at controlled pressure and the hot melt adhesive material is formed to firmly bond to the cell components and tightly seal the cell to effectively prevent electrolyte leakage.

Moreover, the packaging structure of the low-pressure molded fuel cell according to a second embodiment of the present invention comprises:

a housing having a plurality of air vents disposed through at least one wall thereof, a recessed first receiving space formed on and around an inner side of the wall having the air vents;

an air cathode being a porous structure having a plurality of micropores, and disposed on the inner side of the wall of the housing having the air vents;

a separator disposed on an inner surface of the air cathode;

a mounting element disposed in the housing, and being a hollow structure and adjacent to an anode; the mounting element being provided with a raised annular flange on one side adjacent to the separator, such that a recessed second receiving space is formed around an outer periphery of the raised annular flange; the second receiving space together with the first receiving space forming a C-sectioned flow channel; and at least one injection hole provided through a peripheral edge of the mounting element to communicate with the second receiving space; and a hot melt adhesive layer, which is formed through a low-pressure molding process using a hot melt adhesive that has specific material properties and will become molten when being heated; the hot melt adhesive being injected into the cell via injection holes formed on the mounting element to flow through the C-sectioned flow channel, so as to tightly enclose and bond to edges of the air cathode and the separator in the cell, and air in the flow channel being discharged via clearances between the mounting element and the housing. Wherein, after the hot melt adhesive is solidified, a chemical-resistant hot melt adhesive layer being formed with a C-sectioned annular structure and with good sealing and enclosing ability as well as high adhesion strength and elasticity, being bubble removed at controlled pressure and the hot melt adhesive material is formed to firmly bond to the cell components and tightly seal the cell to effectively prevent leakage of the electrolyte from the cell.

With the above arrangements, the packaging structure of the low-pressure molded fuel cell according to the present invention has one or more of the following advantages:

(1) By using the low-pressure molding process, the hot melt adhesive layer with the C-sectioned annular structure formed in the housing around the mounting element has a highly compact structure to enclose the air cathode and the separator therein. The annular hot melt adhesive layer is similar to an airtight rubber gasket and has good viscosity and elasticity such that it is able to closely bond the air cathode to the housing, thereby achieving to perfectly prevent electrolyte from leaking.

(2) The hot melt adhesive layer of the present invention has good tensile strength and pressure resistance and it works like a rubber gasket to protect the air cathode against influences by external force and temperature, preventing the air cathode from breaking and deforming.

(3) By using the low-pressure molding process to form the packaging structure of the fuel cell according to the present invention, the hot melt adhesive is directly injected into the C-sectioned flow channel formed by riveting or butting the housing and the mounting element; and the hot melt adhesive layer can be easily and conveniently formed when the hot melt adhesive is solidified in the C-sectioned flow channel.

(4) The C-sectioned flow channel of the present invention is formed by taking advantage of the cell internal structure, the mounting element, and the hot melt adhesive layer formed in the C-sectioned flow channel without requiring any mold releasing procedure.

(5) By means of the specially designed C-sectioned flow channel, the particular sealant properties of the hot melt adhesive and the low-pressure molding technology according to the present invention, the resultant hot melt adhesive layer can have several distinguished features, comprising good chemical-resistant, sealing and enclosing ability, high adhesion strength and elasticity, bubble-removable capability at controlled pressure and hot melt adhesive material. Therefore, the present invention can provide the fuel cell having a perfect packaging structure.

(6) The packaging structure of the present invention is applicable to different shaped and sized fuel cells to enable to prevent electrolyte leakage and protect the air cathode against damage, so that the fuel cell with the packaging structure of the present invention can increase shelf life and is superior to any other packaging structure of the fuel cell in the prior art.

BRIEF DESCRIPTION OF THE DRAWINGS

The structure and the technology adopted by the present invention to achieve the above and other objects can be understood by referring to the following detailed description of the preferred embodiments and the accompanying drawings, wherein

FIG. 4 is a sectional view taken along a line A-A of FIG. 3a;

FIG. 9 is a sectional view taken along a line C-C of FIG. 8.

DETAILED DESCRIPTION OF THE PREFERRED EMBODIMENTS

Figure 1:
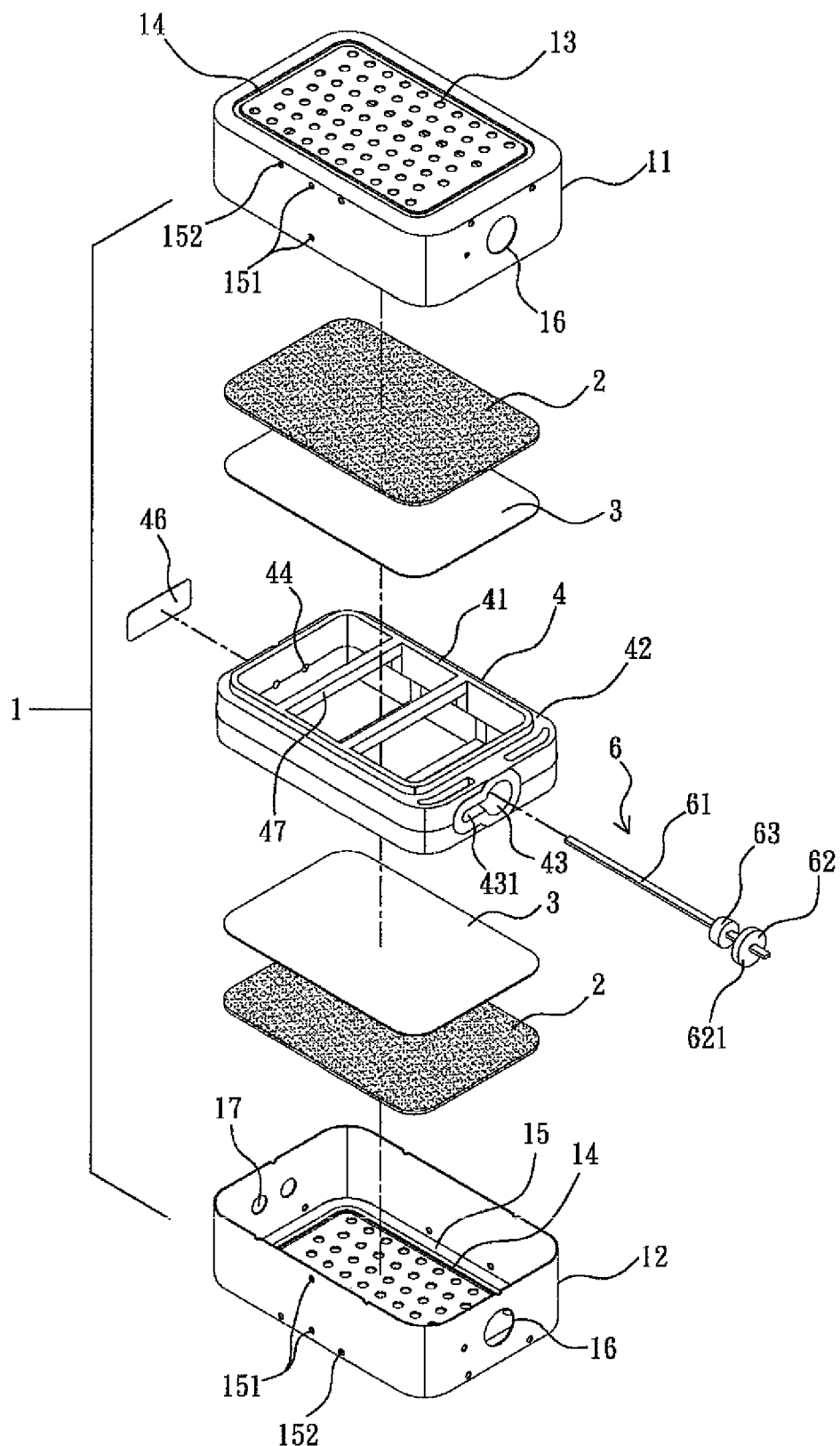
FIG. 1 is an exploded perspective view of a packaging structure of the low-pressure molded fuel cell according to a first embodiment of the present invention.

The present invention will now be described with some preferred embodiments thereof. For the purpose of easy to understand, elements that are the same in the preferred embodiments are denoted by the same reference numerals.

The term "electrolyte leakage" used herein refers to the leakage of the alkali-electrolyte form the cell. The term "C-sectioned" of "C-sectioned annular structure" used herein refers that the cross-section view of the hot melt adhesive layer in the fuel cell shows a C-shaped pattern. The term "C-sectioned flow channel" used herein refers to a flow channel with a C-shaped cross-section formed by assembling the first receiving spaces, air cathode, separator and the second receiving spaces together.

Please refer to FIGS. 1 to 5. A packaging structure of a low-pressure molded fuel cell according to a first embodiment of the present invention, which can be, for example, a packaging structure of a low-pressure molded zinc-air cell, substantially comprises a housing 1, an air cathode 2, a separator 3, a mounting element 4 and a hot melt adhesive layer 5.

The housing 1 forms an outmost layer of the zinc-air cell, and is formed from an upper case 11 and a lower case 12 that are closed to each other. The housing 1 serves mainly as a basic material for packaging the zinc-air cell and defining an exterior appearance of the cell. Basically, when the low-pressure molding technology is adopted in packaging a cell, the hot melt adhesive used for packaging has adhesion strength sufficient to give the upper and the lower case 11, 12. To firmly bond the upper and lower cases 11, 12 to each other, other different connecting manners, such as glue-bonding, mortise and tenon joint, ultrasonic welding or riveting, can also be used as an auxiliary connection. In the illustrated first embodiment, the housing 1 is made of a metal material by a way of stamping to serve as the current collecting component. Meanwhile, a plurality of air vents 13 are provided through the respective bottom walls of the upper and the lower cases 11, 12, such that air can flow into the housing 1 to consume in the air cathode. Further, on an outer side of each of the bottom wall of the upper and lower cases 11, 12, having the air vents 13 formed thereon, there is provided an annular groove 14 by stamping, such that, in each of the upper and lower cases 11, 12, a recessed first receiving space 15 is defined between an outer periphery of the annular groove 14 and an inner side of peripheral walls of the case adjacent to the annular groove 14. Moreover, at least one injection hole 151 and at least one first gas exhaust hole 152 are provided through the respective peripheral walls of the upper and the lower case 11, 12, such that the injection holes 151 and the first gas exhaust holes 152 are communicable with the first receiving spaces 15 in the upper and the lower case 11, 12.

In addition, the upper and the lower case 11, 12 are individually provided at proper positions on, for example, two axially opposite front and rear end walls thereof with an insertion hole 16 and at least one second gas exhaust hole 17, respectively. An anode current collector 61, which will be described in more details later, can have an end exposed from the housing 1 via the insertion holes 16; and hydrogen produced from the side reaction can be discharged from the fuel cell via the adjustment of the second gas exhaust holes 17. The functions of the insertion holes 16 and the second gas exhaust holes 17 would be explained in more details later.

The air electrode 2 is a porous structure having a plurality of micropores and may be made of carbon, a polytetrafluoroethylene (PTFE) binder, and a catalyst. The separator 3 may be a thin film using polymeric materials, such as propylene (PP), polyethylene (PE), PE/PP, etc., or solid polymer electrolyte, such as polyvinyl alcohol (PVA), poly(ethylene oxide) (PEO), etc., or non-woven fabrics. The separator 3 is disposed between an anode 6 and the air cathode 2 to avoid direct contact, and it will result in short circuit. Since the air cathode 2 and the separator 3 are known in the prior art, they are not discussed in details herein.

An air-permeable membrane can be further provided between the housing 1 and the air cathode 2. The air-permeable membrane is a sheet structure made of a water-proof, but air-permeable porous material, such as Teflon®, PP/PE non-woven fabric, etc., and is disposed on the inner side of the housing 1 on the annular grooves 14 mainly for stopping external moisture from entering into the housing 1. A clearance about 0.4~2 mm is opened at between the housing 1 and the air-permeable membrane to serve as a buffer air zone. The buffer air zone is not only to properly adjust the flowing of gas into and out of the housing 1, but also to provide sufficient expansion space while the zinc is oxidized to form zinc oxide (it is due to the density of the zinc oxide much lower than that of the zinc) after the zinc-air cell being discharged. Therefore, the internal pressure of the housing 1 will not be increased, even if being subjected to the internal volume expansion after the zinc-air cell being discharged. Further, the electrolyte in the cell will not be compressed to cause the electrolyte leakage.

Figure 2:
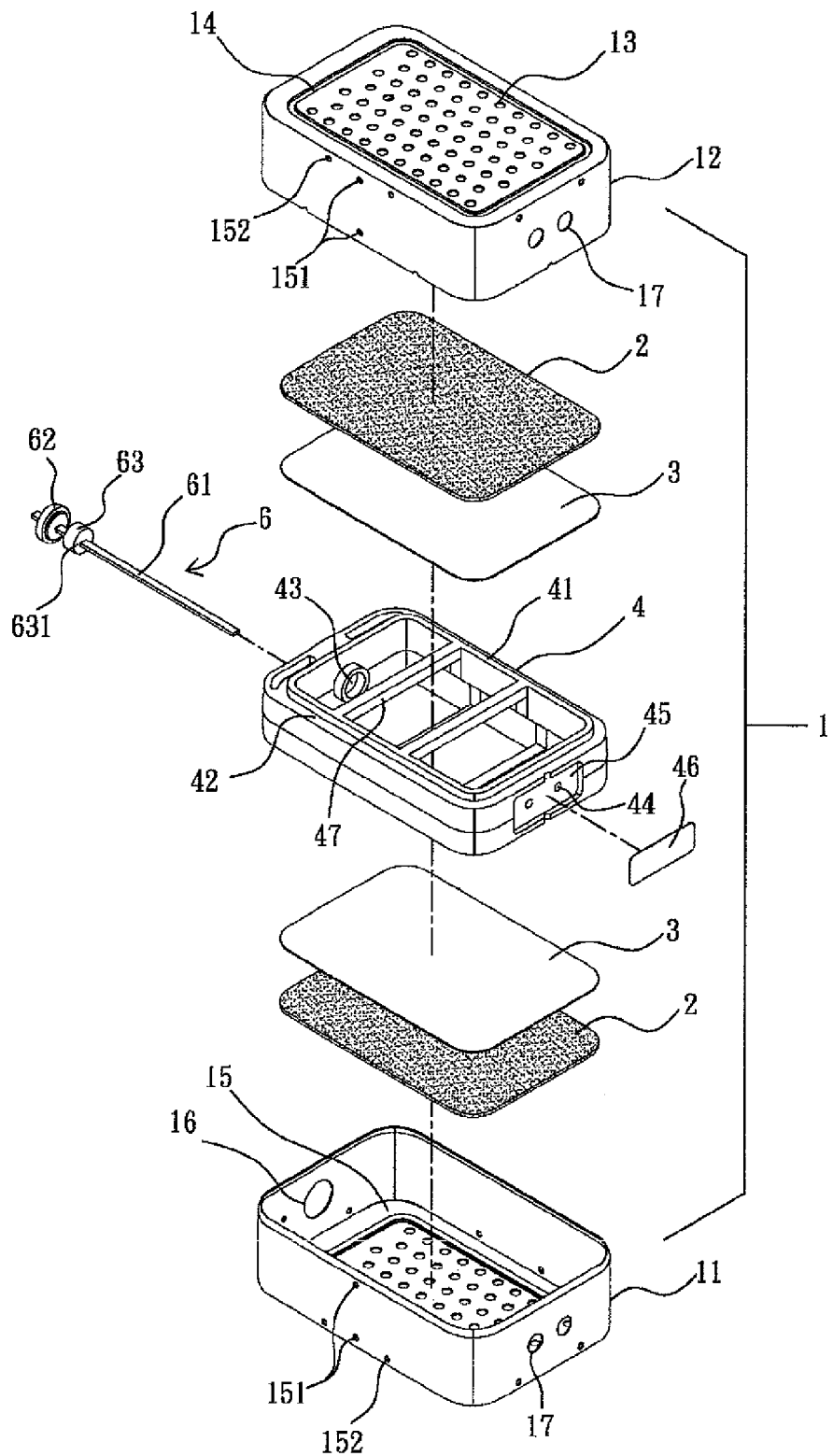
FIG. 2 is an exploded perspective view of the packaging structure of the low-pressure molded fuel cell shown in FIG. 1 but viewed from another angle.

The mounting element 4 is made of an insulating material, for example, a plastic material, such as acrylonitrile butadiene styrene (ABS), PP, PE or other chemical-resisting plastic materials. As can be seen in FIGS. 1 and 2, the mounting element 4 is a hollow frame structure having dimensions and configuration the same as an internal space defined in the mutually closed upper and lower cases 11, 12 and can therefore be received in the housing 1 to bear against the separator 3 and the air cathode 2. In order to form a flow channel between the mounting element 4 and the first receiving space 15 in the housing 1, the mounting element 4 is formed on two sides adjacent to the separator 3 with a raised annular flange 41 each, such that a recessed second receiving space 42 is formed around an outer side of each of the annular flanges 41. When the mounting element 4 in the form of a hollow frame structure is installed in the housing 1, the first receiving spaces 15 and the second receiving spaces 42 together form a C-sectioned flow channel around all edges of the air cathode 2 and the separator 3.

The mounting element 4 is provided with a through hole 43 and at least one opening 44 at positions corresponding to the insertion holes 16 and the second gas exhaust holes 17, respectively. In the illustrated first embodiment, there are two openings 44. The openings 44 are located in a recess 45 disposed on one sidewall of the mounting element 4. A waterproof air-permeable membrane 46, such as an alkali- and water-proof air-permeable membrane, for example, a PTFE film, is positioned in and attached to the recess 45 by a way of heat pressing or gluing, so as to shield the openings 44. Therefore, hydrogen produced from the side reaction can be discharged to the external environment via the openings 44, the air-permeable membrane 46 and the second gas exhaust holes 17. Further, for enhancing the structural stress of the mounting element 4, at least one reinforcing rib 47 can be additionally provided to connect transversely between two opposite sidewalls of the mounting element 4.

Please refer to FIGS. 1 and 2. To assemble the packaging structure of the low-pressure molded fuel cell of the present invention, the air cathode 2 is first disposed on the inner side of the bottom wall of the upper and the lower case 11, 12, such that the air cathode 2 has an out-facing side adjacent to the air vents 13. Then, the separator 3 is attached to an in-facing side of the air cathode 2. Thereafter, the mounting element 4 is positioned in the closed housing 1, such that a set of air cathode 2 and separator 3 is located between an upper side of the mounting element 4 and an upper inner wall surface of the housing 1 and another set of air cathode 2 and separator 3 is located between a lower side of the mounting element 4 and a lower inner wall surface of the housing 1. Finally, the upper and the lower case 11, 12 are riveted to connect to each other, such that the injection holes 151 on the upper case 11 are aligned with the injection holes 151 on the lower case 12, and the insertion holes 16 and the second gas exhaust holes 17 on the housing 1 are aligned with the through hole 43 and the openings 44 on the mounting element 4, respectively.

The hot melt adhesive layer 5 is formed by a low-pressure molding process using a hot melt adhesive that has specific material properties and will become molten when being heated. The molten hot melt adhesive is injected into the housing 1 via the injection holes 151 formed on the housing 1 to flow through the C-sectioned flow channel formed by the first and second receiving spaces 15, 42 of the housing 1 and the mounting element 4. When the molten hot melt adhesive is solidified gradually in the C-sectioned flow channel, the hot melt adhesive layer 5 is formed. In the zinc-air cell, for example, the solidified hot melt adhesive layer 5 integrally encloses all the components of the zinc-air cell therein in one step, including the housing, the air cathode, the separator, and the mounting element. Therefore, the solid C-sectioned annular structure of the hot melt adhesive layer 5 is able to firmly bond to and tightly enclose all the components of the zinc-air cell, such that the zinc-air cell is packaged in a completely sealed and leak-proof manner.

The first gas exhaust holes 152 are communicable with the C-sectioned flow channel, so that air in the C-sectioned flow channel can be discharged via the first gas exhaust holes 152 when the hot melt adhesive is continuously injected into the C-sectioned flow channel under low pressure. The hot melt adhesive selected for use in the present invention has a good chemical-resistance, high adhesion strength and excellent plasticity property. Polymer material suitable for use as the hot melt adhesives of the present invention includes, for example, polyamide, co-polyamide, polyester, and moisture-curing reactive polyurethane hot melt adhesives.

The hot melt adhesive layer 5 not only provides good adhesion effect, but also has a highly compact structure particularly when it is formed through the low-pressure molding process. That is, the hot melt adhesive layer 5 of the present invention can work as an airtight rubber gasket and block the liquid from leaking. In the case, the hot melt adhesive is to be molded using the low-pressure molding process, the operating pressure thereof is at a preferable range of between 1 and 50 kg/cm$^2$, and the viscosity of the molten adhesive is at a range of between 0.2 and 7 Pa·s (tested in compliance with ASTM-D3236 at 190° C.). The solidified hot melt adhesive layer 5 must also have a predetermined adhesion strength. The recommended adhesion strength of the solidified hot melt adhesive layer 5 is above 1~10 MPa.

The higher the adhesion force is, the better the enclosing and leak-proof effect is. Therefore, the molded hot melt adhesive layer 5 itself has tensile strength and pressure resistance at a range of between 0.5 and 8 MPa, and the solidified hot melt adhesive layer 5 itself has elongation at a range of between 50 and 500%.

The anode for the fuel cell system can be divided into two categories according to the material thereof. The first category is a metal anode for use in metal air batteries, for example. And, the second category of the anode includes a chemical substance decomposable to produce hydrogen ions and an electrically conductive substrate coated with a catalyst.

The first type of metal anode can be made of a metal material, such as, for example, zinc, iron, magnesium, and aluminum; a metal gel composed of a metal powder material and a binder, such as zinc gel; a metal plate; a metal sheet; or a porous metal mesh.

The second category of the anode includes a chemical substance decomposable to produce hydrogen ions and an electrically conductive substrate coated with a catalyst. The conductive substrate coated with a catalyst electrochemically reacts with hydrogen, methanol, ethanol, sodium borohydride, hydrazine, or other equivalent chemicals that are decomposable to produce hydrogen ions, so as to convert the aforesaid chemical substance into hydrogen ions and generate electric energy at the same time. The catalyst can be platinum, gold, silver, or other transition metals. The electrically conductive substrate can be porous carbon material, metal mesh, metal rod, metal sheet, etc.

Finally, an anode 6 is loaded in the housing 1 via the insertion holes 16 on the housing 1 and the through hole 43 on the mounting element 4, such that the anode 6 is received in an internal space defined in the mounting element 4. Then, an anode current collector 61 is extended through the insertion holes 16 and the through hole 43, such that an inner end of the anode current collector 61 is enclosed in the anode 6. An outer end of the anode current collector 61 is held in place in the insertion holes 16 on the housing 1 by an insulating ring 62 fitted in the insertion holes 16, and a sealing plug 63 is used to seal the through hole 43. With the outer end of the anode current collector 61 extended through the housing 1, the electric current from the electrochemical reaction of the fuel cell can be conveniently produced. After the anode current collector 61 has been extended through the through hole 43, a closed space is formed between the insulating ring 62 and the sealing plug 63. An amount of hot melt adhesive is injected into the closed space via a recess 431 communicably provided to one side of the through hole 43 to achieve a completely sealed effect. Further, before the through hole 43 is sealed with the sealing plug 63, an inner end surface 631 of the sealing plug 63 and an outer end surface 621 of the insulating ring 62 are coated with a sealing material, such as modified pitch, thermoplastic polymer, synthetic rubber or other sealant suitable for sealing purpose. With the sealant, it is possible to prevent oxidation of the metal upper and lower cases 11, 12 or any leakage of the electrolyte that would adversely affect the electrochemical performance of the fuel cell.

Figure 3A:
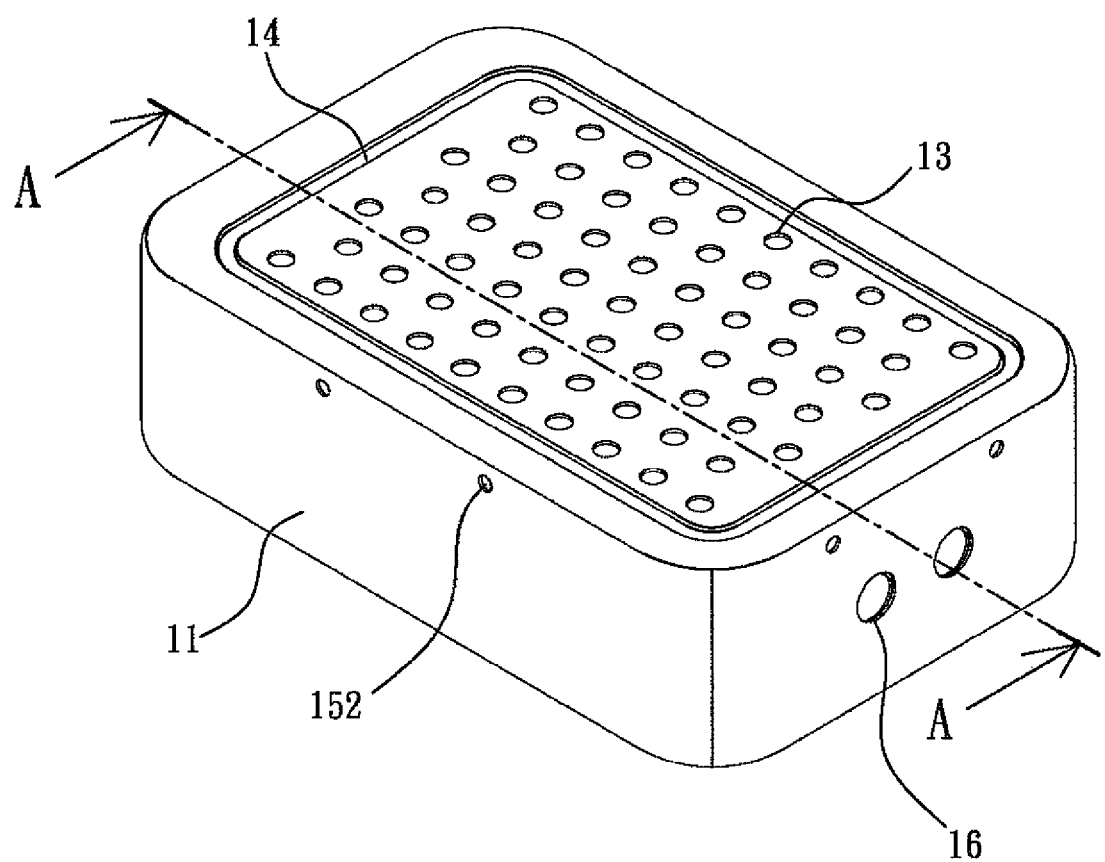
FIGS. 3a and 3b are assembled perspective views of the packaging structure of the low-pressure molded fuel cell of FIG. 1 viewed from two different angles.
Figure 3B:
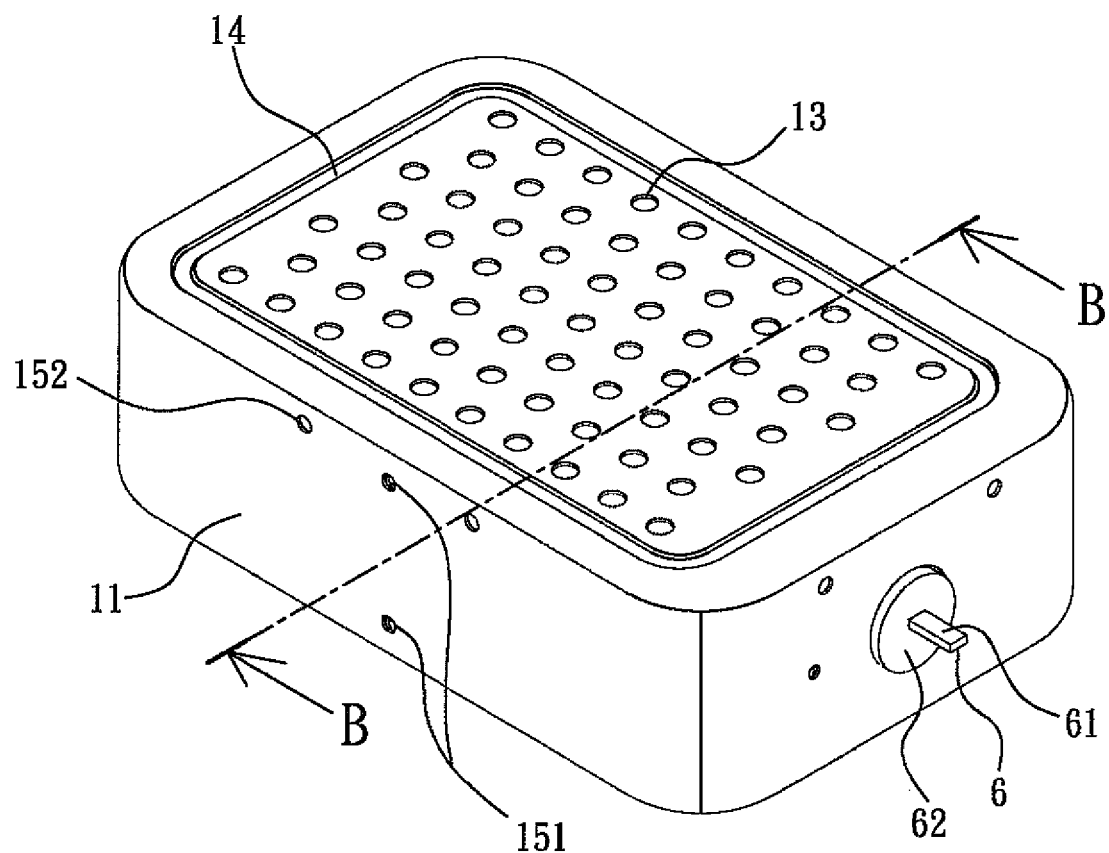
Figure 4:
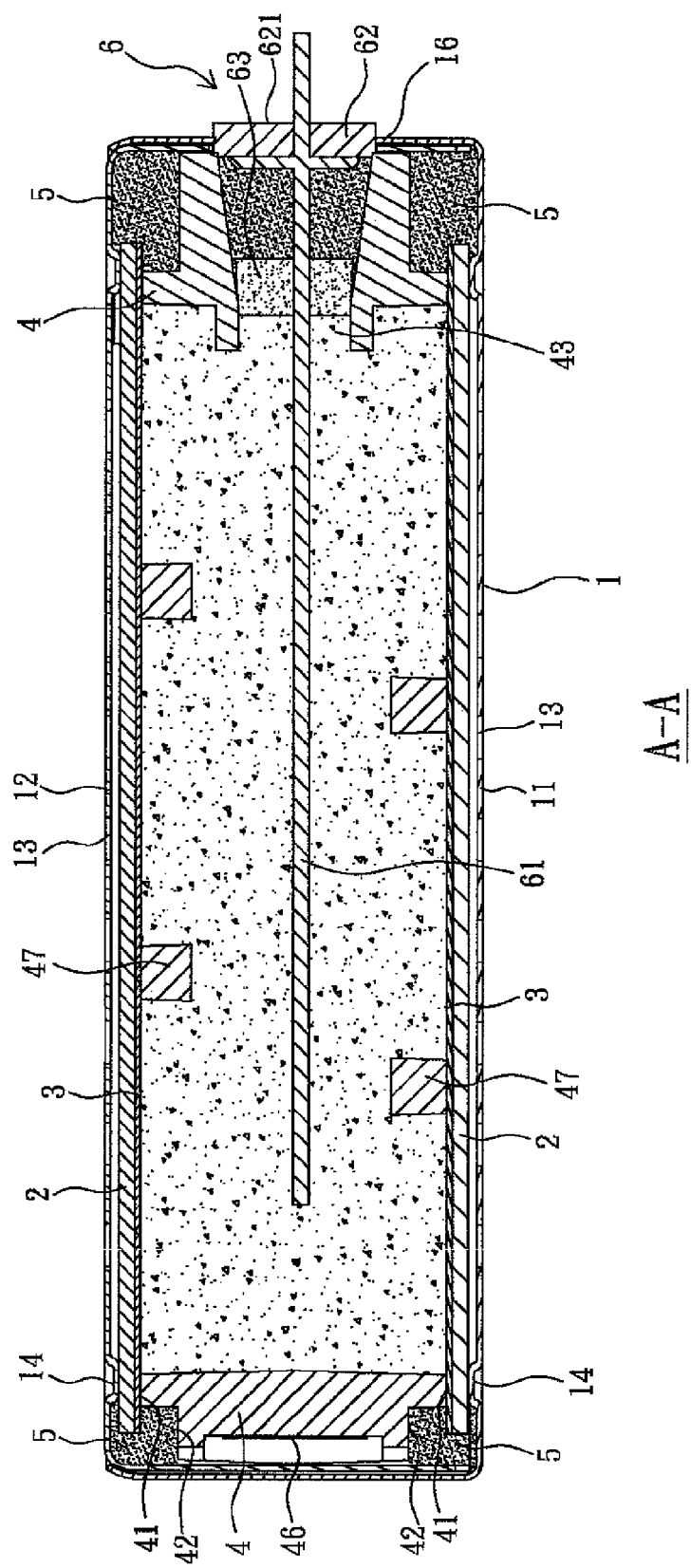
Figure 5:
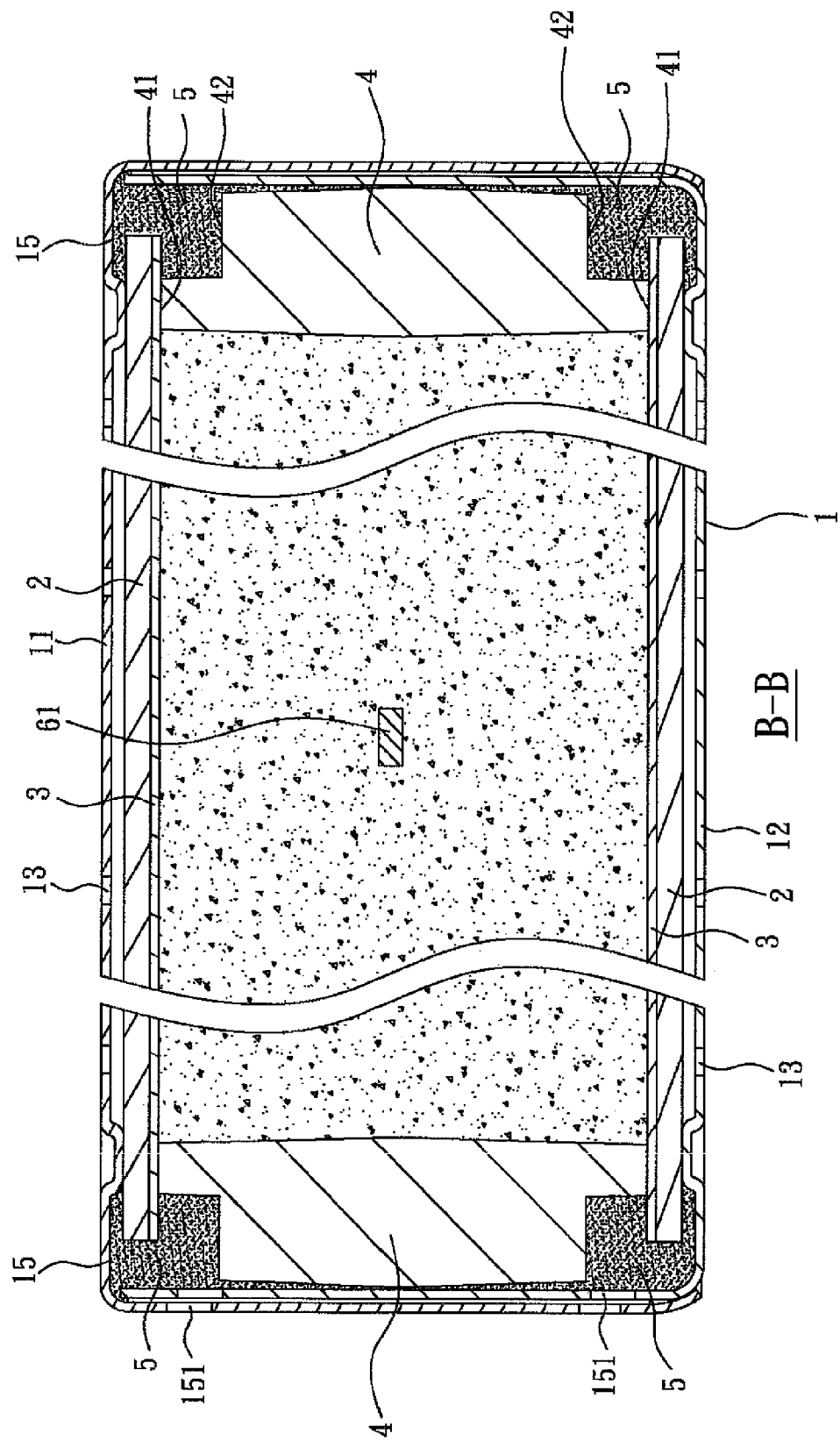
FIG. 5 is a sectional view taken along a line B-B of FIG. 3b.

FIGS. 3a and 3b are two assembled perspective views of the packaging structure of the low-pressure molded fuel cell according to the first embodiment of the present invention viewed from two different angles. FIGS. 4 and 5 are sectional views taken along a line A-A and a line B-B of FIGS. 3a and 3b, respectively, to show that the hot melt adhesive layer 5 has closely enclosed and firmly bond to all edges of the air cathode 2 and the separator 3 so as to achieve the desired purpose of preventing the electrolyte leakage.

FIGS. 6 to 9 illustrate a packaging structure of a low-pressure molded fuel cell according to a second embodiment of the present invention. The second embodiment is generally structurally similar to the first embodiment, except for a plastic housing 1 that could not serve as a cathode as in the first embodiment, and an injection hole that is provided on the mounting element 4 instead of the housing 1.

Figure 6:
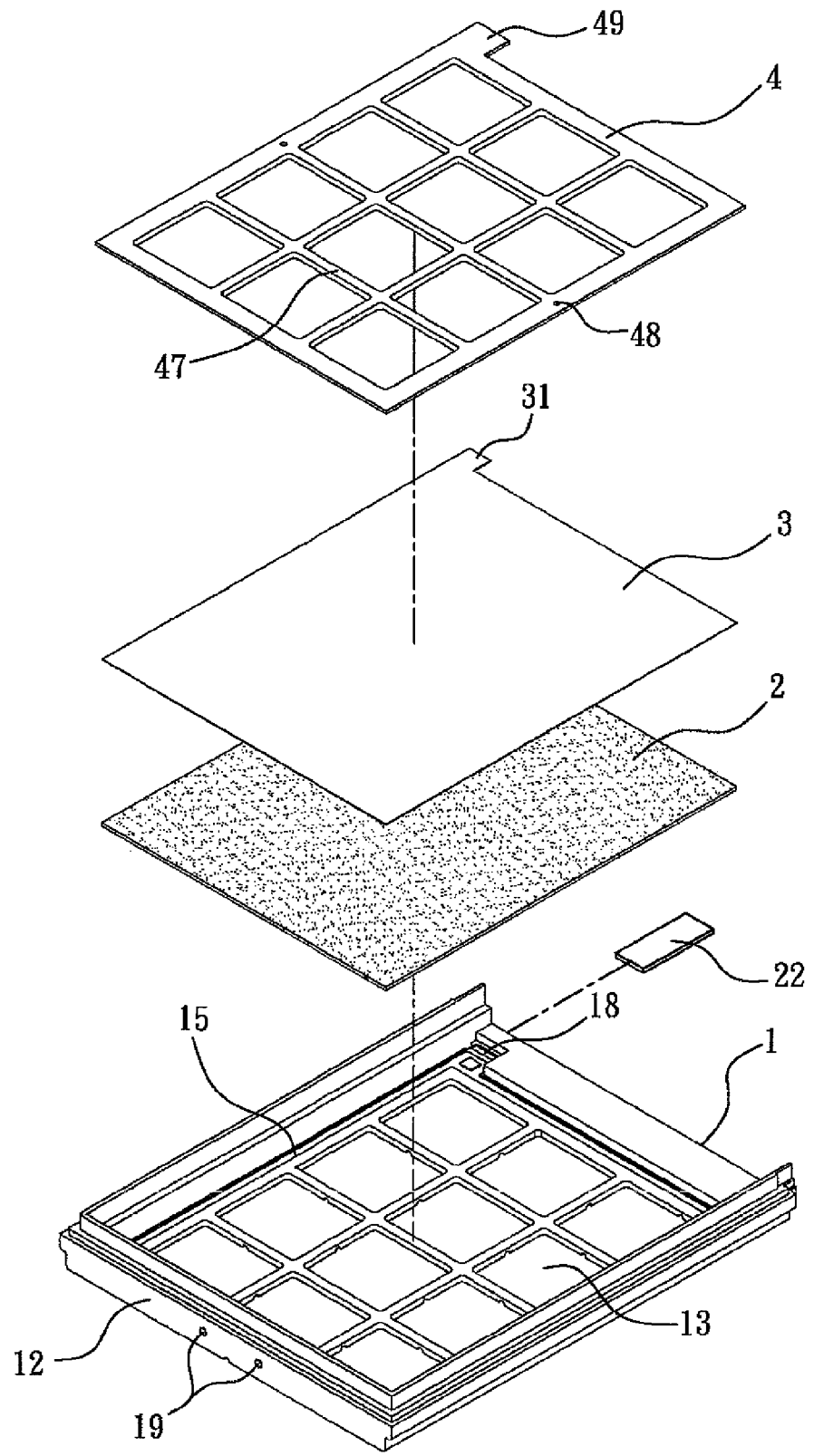
FIG. 6 is an exploded perspective view of a packaging structure of the low-pressure molded fuel cell according to a second embodiment of the present invention.
Figure 7:
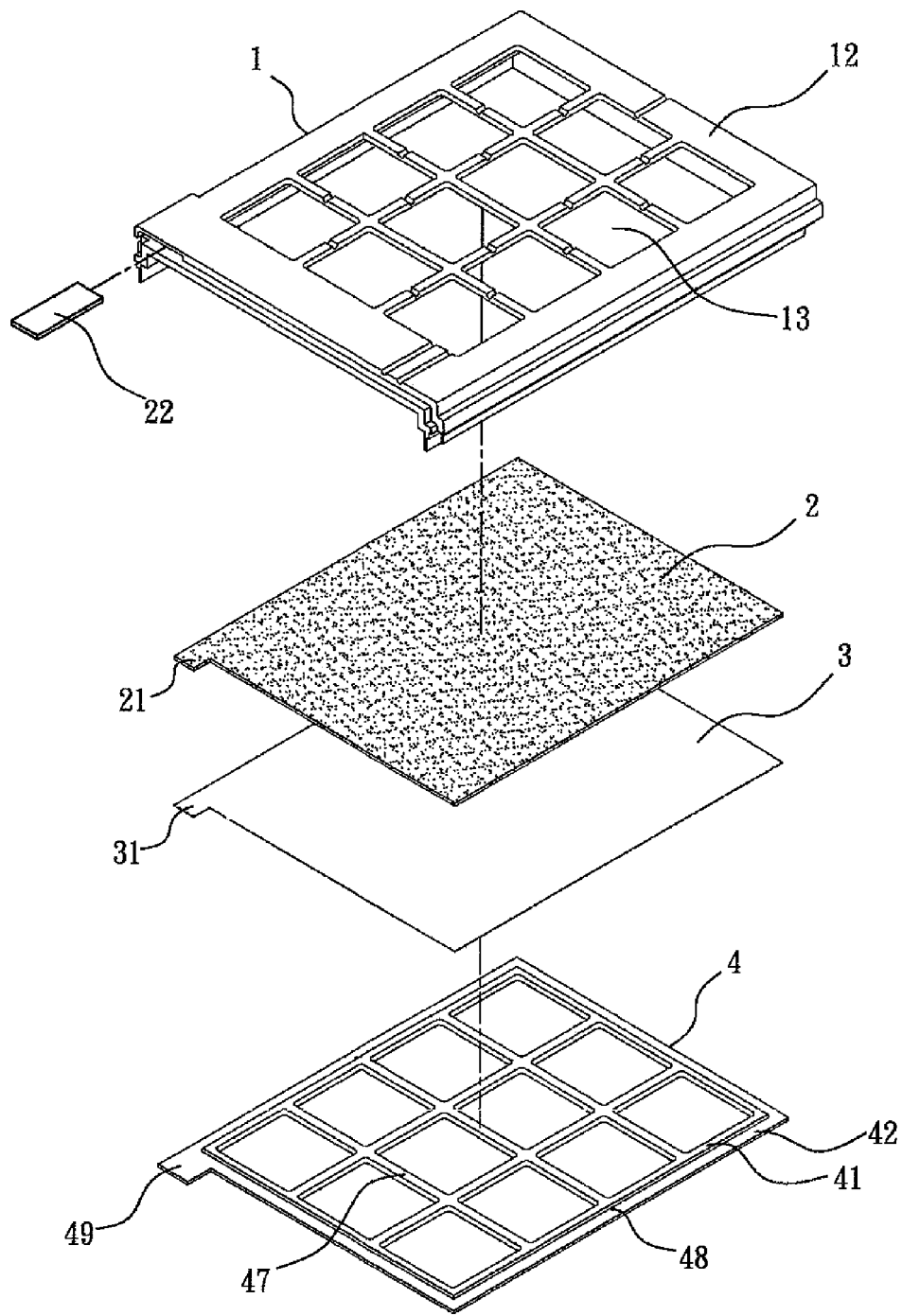
FIG. 7 is an exploded perspective view of the packaging structure of the low-pressure molded fuel cell of FIG. 6 but viewed from another angle.

Please refer to FIGS. 6 and 7. For the purpose of explaining the second embodiment in an easier and clearer manner, only a lower half of the packaging structure of the fuel cell is described and illustrated hereinafter. As shown, the lower half of the packaging structure of the fuel cell according to the second embodiment of the present invention includes a lower case 12, an air cathode 2, a separator 3, a mounting element 4 and a hot melt adhesive layer.

The lower case 12 is provided on a bottom wall thereof with a plurality of air vents 13, and is formed on and around an inner side of the bottom wall with a recessed first receiving space 15.

The air cathode 2 and the separator 3 are the same as those in the first embodiment, except for a sideward projected portion 21, 31 pointed to an open side of the lower case 12 to be received in a locating recess 18 which is formed on an inner side of one sidewall of the lower case 12 and communicates with the first receiving space 15. A cathode current collector 22 is positioned at the locating recess 18 to contact with the air cathode 2, and an end of the cathode current collector 22 is exposed from the fuel cell. Electric current generated from the cathodic reaction at the air cathode 2 is led out via the exposed end of the cathode current collector 22. Moreover, the lower case 12 is provided on an inner side of another sidewall with at least one through hole 19. The through hole 19 is shielded with an air-permeable membrane (not shown), so that gas produced in the side reaction in the fuel cell can be discharged via the through hole 19.

The mounting element 4 is a hollow plate. As can be seen in FIG. 7, the mounting element 4 has dimensions and configuration the same as an inner space defined by the lower case 12, such that the mounting element 4 can be received in the lower case 12 to bear against the separator 3 and the air cathode 2. In order to form a flow channel between the mounting element 4 and the first receiving space 15 in the lower case 12, the mounting element 4 is formed on one side adjacent to the separator 3 with a raised annular flange 41, such that a second receiving space 42 is formed around an outer side of the annular flange 41. When the mounting element 4 in the form of a hollow plate is installed in the lower case 12, the first receiving space 15 and the second receiving space 42 together form a C-sectioned flow channel around all edges of the air cathode 2 and the separator 3. Further, to enhance the structural strength of the mounting element 4, a plurality of intersected reinforcing ribs 47 can be additionally provided to connect transversely between two pairs of opposite sidewalls of the mounting element 4. The second embodiment is characterized in that the mounting element 4 is provided near a peripheral edge thereof at appropriate position(s) with at least one injection hole 48 communicating with the second receiving space 42, and that the mounting element 4 is provided with a sideward projected sealing tab 49 corresponding to the locating recess 18 on the lower case 12, so that the locating recess 18 is closed by the sealing tab 49.

Figure 8:
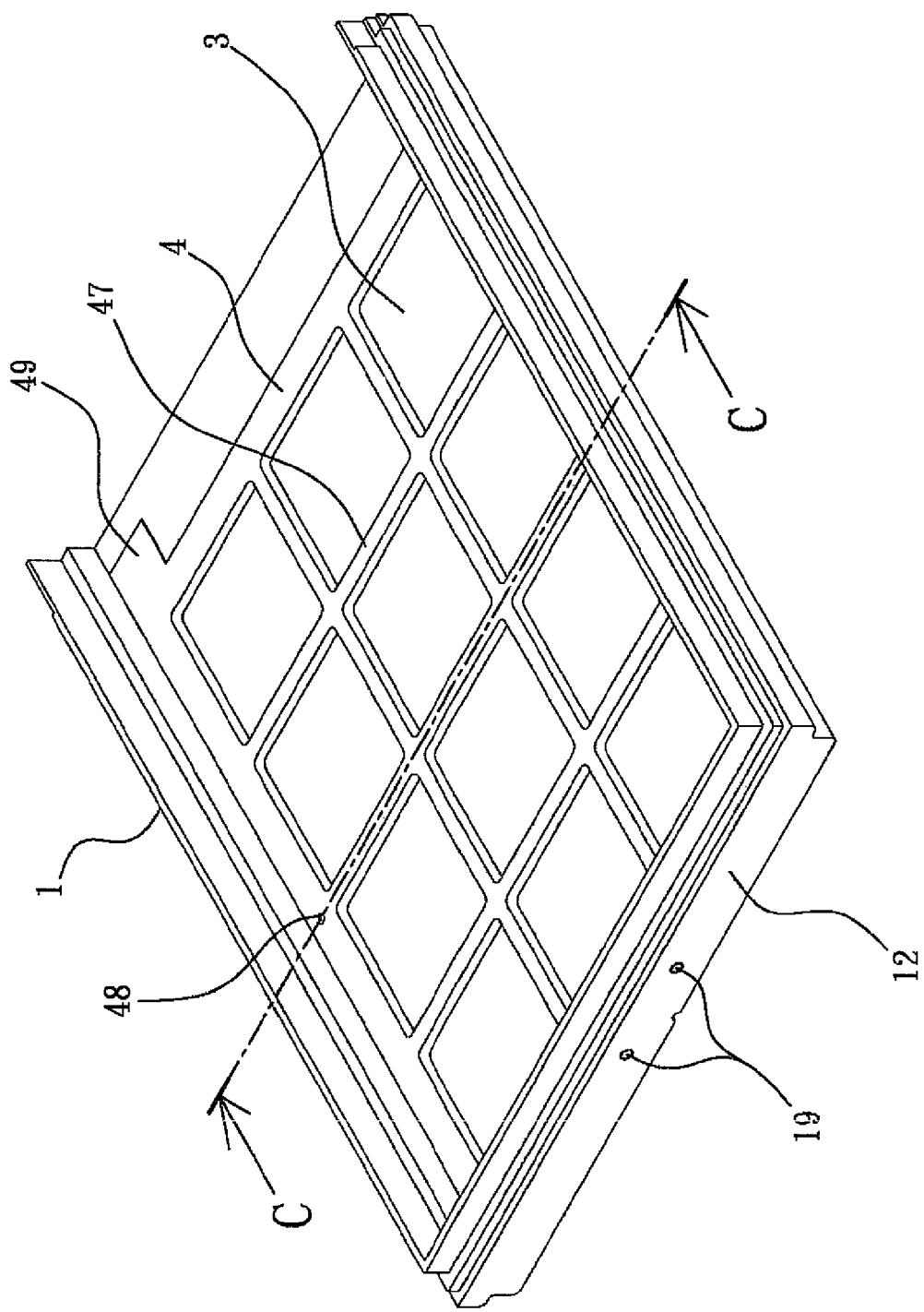
FIG. 8 is an assembled perspective view of FIG. 6.

FIG. 8 is an assembled perspective view of FIG. 6, and FIG. 9 is a sectional view taken along a line C-C of FIG. 8. Please refer to FIGS. 8 and 9. To inject hot melt adhesive into the first and the second receiving space 15, 42, a tool with a preformed flow channel is first positioned on the mounting element 4, and then a low-pressure molding process is performed to inject a hot melt adhesive in a molten state into the flow channel on the molded tool. The hot melt adhesive can be, for example, polyamide. The molten hot melt adhesive flows through the flow channel on the tool into the C-sectioned flow channel formed from the first and the second receiving space 15, 42 on the lower case 12 and the mounting element 4, respectively, via the injection hole 48 provided on the mounting element 4, so as to closely bond all edges of the air cathode 2 and the separator 3 and firmly bond thereto. Since the mounting element 4 and the lower case 12 are not in completely close contact with each other, air in the C-sectioned flow channel can be discharged from the lower case 12. Moreover, a low pressure is gradually applied when the hot melt adhesive is injected into the C-sectioned flow channel. Therefore, a hot melt adhesive layer 5 surrounding the air cathode 2 and the separator 3 with having highly compact and strong structure are formed.

The packaging structure completed in the above-described procedures is then assembled to an upper case, which is also made of a plastic material, an anode, and an anode current collector to provide a leak-proof packaging structure of a fuel cell.

In the packaging structure of the low-pressure molded fuel cell of the present invention, the packaging of the housing, such as by connecting metal to metal case, metal to plastic case, or plastic to plastic case through application of pressure, provides the first electrolyte leak prevention. The hot melt adhesive layer 5 functioning as a sealing material and formed around the edges of the air cathode 2 through low-pressure molding injected molten hot melt adhesive provides the second leak prevention. Moreover, the adhesion strength between the molded hot melt adhesive layer 5 and the air cathode provides the third leak prevention. With these leak prevention measurements, the packaging structure of the fuel cell according to the present invention is perfectly leak-proof.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A packaging structure of a low-pressure molded fuel cell, comprising:

a housing having a plurality of air vents disposed through at least one wall thereof, a recessed first receiving space formed on and around an inner side of the wall having the air vents, and at least one injection hole and at least one first gas exhaust hole disposed through a peripheral wall of the housing to communicate with the first receiving space;

an air cathode being a porous structure having a plurality of micropores, and disposed on the inner side of the wall of the housing having the air vents;

a separator disposed on an inner surface of the air cathode;

a mounting element disposed in the housing and being a hollow structure for receiving an anode therein; the mounting element being provided with a raised annular flange on one side adjacent to the separator, such that a recessed second receiving space is formed around an outer periphery of the raised annular flange; and the second receiving space together with the first receiving space forming a C-sectioned flow channel; and a hot melt adhesive layer being a C-sectioned annular structure to enclose and bond to edges of the air cathode, the separator and the mounting element;

wherein the hot melt adhesive layer is formed through a low-pressure molding process, in which a hot melt adhesive in a molten state is injected into the C-sectioned flow channel via the injection hole provided on the housing; the molten hot melt adhesive flows through the C-sectioned flow channel to bond to and enclose the edges of the air cathode and the separator while any air in the C-sectioned flow channel is discharged via the first gas exhaust hole; and, the hot melt adhesive layer is formed when the hot melt adhesive is solidified;

wherein the mounting element is provided with a through hole on a sidewall, and the housing is provided with an insertion hole at a position corresponding to the through hole; the anode is loaded in the mounting element via the insertion hole and the through hole; an anode current collector is inserted into the mounting element through the insertion hole and the through hole, such that an inner end of the anode current collector is in contact with the anode; and a sealing plug is used to seal the through hole and an insulating ring being fitted in the insertion hole for firmly holding an outer end of the anode current collector that is extended through the housing for producing electric current;

wherein, after the anode current collector has been inserted through the through hole, a closed space is formed between the insulating ring and the sealing plug; and an amount of hot melt adhesive is injected into the closed space via a recess communicably provided to one side of the through hole.

2. The packaging structure of the low-pressure molded fuel cell as claimed in claim 1, wherein the hot melt adhesive is selected from the group consisting of polyamide, co-polyamide, polyester, and moisture-curing reactive polyurethane hot-melt adhesive.

3. The packaging structure of the low-pressure molded fuel cell as claimed in claim 2, wherein the hot melt adhesive in the molten state has an adhesive viscosity at a range of between 0.2 and 7 Pa·s; and the solidified hot melt adhesive layer has adhesive strength at a range of between 1 and 10 MPa, tensile strength and pressure resistance at a range of between 0.5 and 8 MPa, and elongation at a range of between 50 and 500%.

4. The packaging structure of the low-pressure molded fuel cell as claimed in claim 1, wherein at least one opening is disposed through one sidewall of the mounting element and is shielded by an air-permeable membrane; and wherein the housing is provided with a second gas exhaust hole at a position, corresponding to the opening of the mounting element, such that gas produced in the cell reaction is via the opening and the second gas exhaust hole.

5. The packaging structure of the low-pressure molded fuel cell as claimed in claim 4, wherein the opening is formed in a recess disposed on the sidewall of the mounting element, and the air-permeable membrane is made of an alkali-proof polytetrafluoroethylene material, and shields the opening by a way of heat pressing or gluing.

6. The packaging structure of the low-pressure molded fuel cell as claimed in claim 1, wherein at least one reinforcing rib is provided to connect transversely between two opposite sidewalls of the mounting element.

7. The packaging structure of the low-pressure molded fuel cell as claimed in claim 1, wherein an inner end surface of the sealing plug and an outer end surface of the insulating ring are coated with a sealant selected from the groups consisting of modified pitch, thermoplastic polymer, synthetic rubber and other equivalent material suitable for sealing purpose, so as to prevent oxidation of metallic upper and lower cases of the housing or any leakage of electrolyte.

8. The packaging structure of the low-pressure molded fuel cell as claimed in claim 1, wherein the housing is formed from a metallic upper case and a metallic lower case closed to each other; and wherein the wall of the housing having the air vents is provided with an annular groove on and around an outer side thereof, such that the first receiving space is defined between an outer periphery of the annular groove and an inner side of peripheral walls of the upper and lower cases.

9. The packaging structure of the low-pressure molded fuel cell as claimed in claim 1, wherein the anode is made of a material selected from the group consisting of a metal material, a metal gel, a metal plate, a metal sheet and a porous metal mesh; and the metal material being selected from the group consisting of zinc, iron, magnesium and aluminum.

10. The packaging structure of the low-pressure molded fuel cell as claimed in claim 1, wherein the anode comprises a chemical substance decomposable to produce hydrogen ions and an electrically conductive substrate coated with a catalyst; and wherein the electrically conductive substrate coated with the catalyst reacts electrochemically with hydrogen, methanol, ethanol, sodium borohydride, hydrazine or other equivalent chemical substances that are decomposable to produce hydrogen ions, so as to convert the aforesaid chemical substances into hydrogen ions and generate electric energy at the same time.

11. The packaging structure of the low-pressure molded fuel cell as claimed in claim 10, wherein the catalyst is selected from the group consisting of platinum, gold, silver and other transition metals; and the electrically conductive substrate is selected from the group consisting of a porous carbon material, metal mesh, metal rod and metal sheet.

12. A packaging structure of the low-pressure molded fuel cell, comprising:

a housing having a plurality of air vents disposed through at least one wall thereof, a recessed first receiving space formed on and around an inner side of the wall having the air vents;

an air cathode being a porous structure having a plurality of micropores, and disposed on the inner side of the wall of the housing having the air vents;

a separator disposed on an inner surface of the air cathode;

a mounting element disposed in the housing, and being a hollow structure and adjacent to an anode; the mounting element being provided with a raised annular flange on one side adjacent to the separator, such that a recessed second receiving space is formed around an outer periphery of the raised annular flange; the second receiving space together with the first receiving space forming a C-sectioned flow channel; and at least one injection hole provided through a peripheral edge of the mounting element to communicate with the second receiving space; and a hot melt adhesive layer being a C-sectioned annular structure to enclose and bond to edges of the air cathode, the separator and the mounting element;

wherein the hot melt adhesive layer is formed through a low-pressure molding process, in which a hot melt adhesive in a molten state is injected into the C-sectioned flow channel via the injection hole provided on the mounting element; the molten hot melt adhesive flows through the C-sectioned flow channel to bond to and enclose the edges of the air cathode and the separator while any air in the C-sectioned flow channel is discharged via a clearance between the mounting element and the housing; and, the hot melt adhesive layer is formed when the hot melt adhesive is solidified;

wherein at least one opening is disposed through one sidewall of the housing and is shielded by an air-permeable membrane, such that any gas produced in the cell reaction is discharged via the opening;

wherein the air-permeable membrane is made of an alkali-proof polytetrafluoroethylene material, and shields the opening by a way of heat pressing or gluing.

13. The packaging structure of the low-pressure molded fuel cell as claimed in claim 12, wherein the hot melt adhesive is selected from the group consisting of polyamide, co-polyamide, polyester, and moisture-curing reactive polyurethane hot melt adhesives.

14. The packaging structure of the low-pressure molded fuel cell as claimed in claim 13, wherein the hot melt adhesive in the molten state has an adhesive viscosity at a range of between 0.2 and 7 Pa·s; and the solidified hot melt adhesive layer has adhesion strength at a range of between 1 and 10 MPa, tensile strength and pressure resistance at a range of between 0.5 and 8 MPa, and elongation at a range of between 50 and 500%.

15. The packaging structure of the low-pressure molded fuel cell as claimed in claim 12, wherein at least one reinforcing rib is provided to connect transversely between two opposite sidewalls of the mounting element.

16. The packaging structure of the low-pressure molded fuel cell as claimed in claim 12, wherein the housing is provided on an inner wall surface at an open side thereof with a locating recess communicating with the first receiving space, the air cathode and the separator are respectively provided with a sideward extended portion corresponding to and accordingly, being received in the locating recess; a cathode current collector being provided to contact with the air cathode and exposed from the fuel cell; and the mounting element being provided at a position, corresponding to the locating recess with a sideward projected sealing tab for closing the locating recess.

17. The packaging structure of the low-pressure molded fuel cell as claimed in claim 12, wherein the housing is formed from a plastic upper case and a plastic lower case closed to each other.

18. The packaging structure of the low-pressure molded fuel cell as claimed in claim 12, wherein the anode is made of a material selected from the group consisting of a metal material, a metal gel, a metal plate, a metal sheet and a porous metal mesh; and the metal material being selected from the group consisting of zinc, iron, magnesium and aluminum.

19. The packaging structure of the low-pressure molded fuel cell as claimed in claim 12, wherein the anode comprises a chemical substance decomposable to produce hydrogen ions and an electrically conductive substrate coated with a catalyst; and wherein the electrically conductive substrate coated with the catalyst reacts electrochemically with hydrogen, methanol, ethanol, sodium borohydride, hydrazine or other equivalent chemical substances that are decomposable to produce hydrogen ions, so as to convert the aforesaid chemical substances into hydrogen ions and generate electric energy at the same time.

20. The packaging structure of the low-pressure molded fuel cell as claimed in claim 19, wherein the catalyst is selected from the group consisting of platinum, gold, silver and other transition metals; and the electrically conductive substrate is selected from the group consisting of a porous carbon material, metal mesh, metal rod and metal sheet.

* * * * *